(12) United States Patent
Adles et al.

(10) Patent No.: US 8,971,701 B2
(45) Date of Patent: Mar. 3, 2015

(54) CUEING SYSTEM FOR UNIVERSAL OPTICAL RECEIVER

(75) Inventors: Eric J. Adles, Ellicott City, MD (US); Michael L. Dennis, Ellicott City, MD (US); Raymond M. Sova, Reisterstown, MD (US); Joseph E. Sluz, Ellicott City, MD (US); Michael G. Taylor, Laurel, MD (US); Curtis R. Menyuk, Silver Spring, MD (US); John W. Zweck, Plano, TX (US)

(73) Assignee: The Johns Hopkins University, Baltimore, MD (US)

( * ) Notice: Subject to any disclaimer, the term of this patent is extended or adjusted under 35 U.S.C. 154(b) by 87 days.

(21) Appl. No.: 13/603,046

(22) Filed: Sep. 4, 2012

(65) Prior Publication Data

US 2014/0064723 A1  Mar. 6, 2014

Related U.S. Application Data

(60) Provisional application No. 61/640,812, filed on May 1, 2012.

(51) Int. Cl.
| | |
|---|---|
| *H04B 10/08* | (2006.01) |
| *H04B 17/00* | (2006.01) |
| *H04B 10/00* | (2013.01) |
| *H04B 10/06* | (2006.01) |
| *H04B 10/61* | (2013.01) |
| *H04B 10/079* | (2013.01) |

(52) U.S. Cl.
CPC .......... *H04B 10/616* (2013.01); *H04B 10/0795* (2013.01)
USPC ............... 398/25; 398/24; 398/33; 398/28; 398/155; 398/207

(58) Field of Classification Search
CPC ............. H04B 10/61; H04B 2210/517; H04B 10/0775; H04B 10/079; H04B 10/0793; H04B 10/07951; H04B 10/07955; H04B 10/07957
USPC .......................... 398/25, 24, 33, 28, 155, 207
See application file for complete search history.

(56) References Cited

U.S. PATENT DOCUMENTS

| | | | |
|---|---|---|---|
| 6,690,746 B1 * | 2/2004 | Sills et al. ...................... | 375/316 |
| 7,187,871 B1 | 3/2007 | Kaushik | |
| 7,254,325 B2 | 8/2007 | Hoshida | |
| 7,406,269 B2 | 7/2008 | Becker et al. | |
| 7,623,790 B2 * | 11/2009 | Marom .......................... | 398/94 |
| 7,826,752 B1 | 11/2010 | Zanoni et al. | |
| 7,881,618 B2 * | 2/2011 | Yan et al. ....................... | 398/185 |
| 8,026,837 B1 * | 9/2011 | Valley et al. ................... | 341/137 |

(Continued)

*Primary Examiner* — David Payne
*Assistant Examiner* — Pranesh Barua
(74) *Attorney, Agent, or Firm* — Noah J. Hayward

(57) ABSTRACT

A universal optical receiver may include an optical channel monitor configured to acquire spectral data for an optical signal on at least one selected optical channel, a tunable local oscillator configured to be tuned to a center frequency of the optical signal on the at least one selected optical channel, a storage device configured to store data associated with the optical signal responsive to acquisition of the spectral data and tuning of the tunable local oscillator, and processing circuitry configured to execute an algorithm that employs a plurality of binary distinctions based on physical characteristics of the optical signal and employs at least one calculation of figure of merit associated with a series of parameter values of the optical signal to identify a format of the optical signal.

19 Claims, 9 Drawing Sheets

(56) References Cited

U.S. PATENT DOCUMENTS

| | | |
|---|---|---|
| 8,131,148 B2 | 3/2012 | Sun et al. |
| 2007/0071441 A1* | 3/2007 | Marom ............................ 398/25 |
| 2009/0110401 A1* | 4/2009 | Sakharov ......................... 398/79 |
| 2009/0141828 A1* | 6/2009 | Huang et al. .................... 375/296 |
| 2009/0214212 A1* | 8/2009 | Vorbeck et al. .................. 398/79 |
| 2010/0074614 A1* | 3/2010 | DeLew et al. ................... 398/17 |
| 2010/0129076 A1* | 5/2010 | Barbarossa ...................... 398/48 |
| 2011/0074500 A1* | 3/2011 | Bouillet et al. ................. 329/347 |
| 2011/0236013 A1 | 9/2011 | Gazzola et al. |
| 2011/0274430 A1 | 11/2011 | Nakashima et al. |
| 2012/0027065 A1* | 2/2012 | Ray et al. ........................ 375/224 |
| 2012/0027403 A1* | 2/2012 | Darr et al. ....................... 398/25 |
| 2012/0082460 A1* | 4/2012 | Wu et al. ......................... 398/79 |
| 2012/0082466 A1* | 4/2012 | Wu et al. ........................ 398/183 |
| 2012/0224862 A1* | 9/2012 | Liu et al. ........................ 398/152 |
| 2012/0251120 A1* | 10/2012 | McNicol et al. ................. 398/91 |
| 2012/0257697 A1* | 10/2012 | Zhou et al. ...................... 375/346 |
| 2013/0084064 A1* | 4/2013 | Akasaka .......................... 398/34 |

* cited by examiner

CUEING SYSTEM FOR UNIVERSAL OPTICAL RECEIVER

CROSS-REFERENCE TO RELATED APPLICATIONS

This application claims the benefit of U.S. Provisional Application No. 61/640,812 filed on May 1, 2012, the entire contents of which are hereby incorporated herein by reference.

STATEMENT OF GOVERNMENTAL INTEREST

This invention was made with U.S. Government support under Office of Naval Research contract number H98230-009-D-0040. The U.S. Government has certain rights in the invention.

TECHNICAL FIELD

Exemplary embodiments of the present disclosure generally relate to fiber optic communication, and more specifically to a receiver that is able to determine a modulation format and transmission impairments for optical channels without any a priori knowledge of the optical transmitter.

BACKGROUND

Optical communications continue to expand in ubiquity and reliability. However, as is the case with many communication techniques, it is often typical that a specific receiver must be employed for communication with any particular transmitter. As such, while the communication medium itself (i.e., fiber optic cables) can support any of a wide range of signal characteristics such as data rates, modulation formats and/or the like, the receiver to be employed for processing a signal having particular signal characteristics must often be matched to the corresponding transmitter that generates the signal. This matching ensures that the receiver can demodulate or otherwise handle the signal that the transmitter is generating.

The above described common requirement for matching transmitters and receivers often means that any time one of these pieces of equipment is upgraded or replaced, the corresponding other piece of equipment must also be upgraded or replaced. Moreover, the same manufacturer may need to be used when buying a transmitter for a particular receiver, or vice versa. However, even where different manufacturers or brands can be used together, consideration of the interoperability of network communication equipment must always be considered. Otherwise, a conventional receiver that is paired with a transmitter employing a particular modulation technique may not be able to demodulate the signals generated by the transmitter

BRIEF SUMMARY OF SOME EXAMPLES

Accordingly, some example embodiments may enable the provision of a universal optical receiver that may be interoperable with a plurality of different transmitters. In this regard, for example, some embodiments may be enabled to identify the data rate, modulation format and/or transmission impairments associated with optical signals on one or more channels over which signaling may be sampled or received. Example embodiments may therefore allow for identification of the type of signal being transmitted based on physical characteristics of the optical signal and without a priori knowledge of the optical transmitter. Thereafter, a universal optical receiver of an example embodiment may be enabled to configure itself to demodulate the optical signal and recover any information encoded on the optical signal. In some cases, the receiver may include software that is configurable to enable the optimal processing of a signal after the signal has been classified.

In one example embodiment, a universal optical receiver is provided. The universal optical receiver may include an optical channel monitor configured to acquire spectral data for an optical signal on at least one selected optical channel, a tunable local oscillator configured to be tuned to a center frequency of the optical signal on the at least one selected optical channel, a storage device configured to store data associated with the optical signal responsive to acquisition of the spectral data and tuning of the tunable local oscillator, and processing circuitry configured to execute an algorithm that employs a plurality of binary distinctions based on physical characteristics of the optical signal and employs at least one calculation of figure of merit associated with a series of parameter values of the optical signal to identify a format of the optical signal.

In another example embodiment, a method of processing an optical signal in a universal optical receiver is provided. The method may include employing an optical channel monitor to acquire spectral data for the optical signal on at least one selected optical channel, tuning a tunable local oscillator to a center frequency of the optical signal on the at least one selected optical channel, storing data associated with the optical signal responsive to acquisition of the spectral data and tuning of the tunable local oscillator, and executing (e.g., via processing circuitry) an algorithm that employs a plurality of binary distinctions based on physical characteristics of the optical signal and employs at least one calculation of figure of merit associated with a series of parameter values of the optical signal to identify a format of the optical signal.

In another example embodiment, a computer program product comprising a computer-readable storage medium having computer-executable program code instructions stored therein is provided. The computer-executable program code instructions my include program code instructions for employing an optical channel monitor to acquire spectral data for the optical signal on at least one selected optical channel, tuning a tunable local oscillator to a center frequency of the optical signal on the at least one selected optical channel, storing data associated with the optical signal responsive to acquisition of the spectral data and tuning of the tunable local oscillator, and executing (e.g., via processing circuitry) an algorithm that employs a plurality of binary distinctions based on physical characteristics of the optical signal and employs at least one calculation of figure of merit associated with a series of parameter values of the optical signal to identify a format of the optical signal.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 6A:
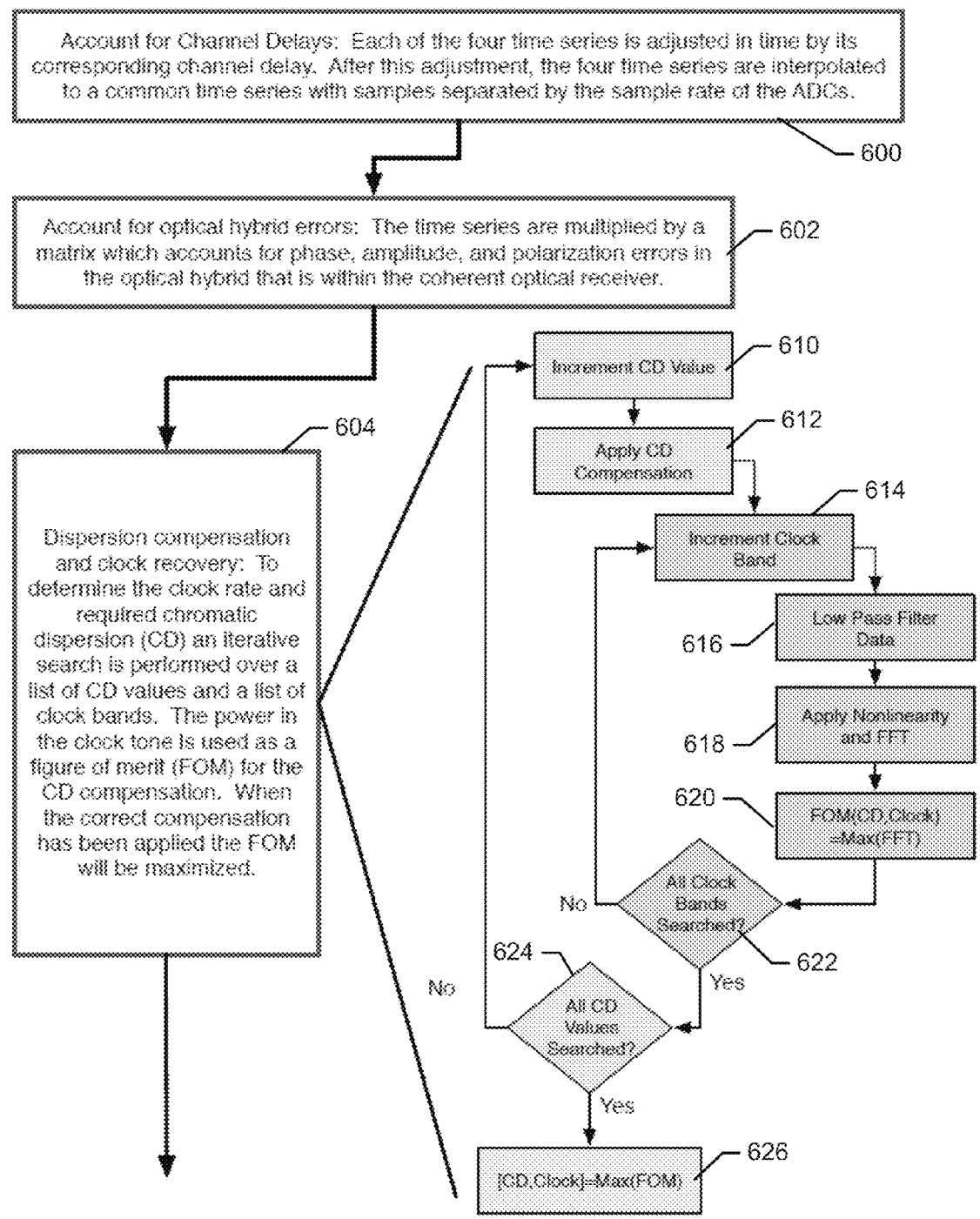
Figure 6B:
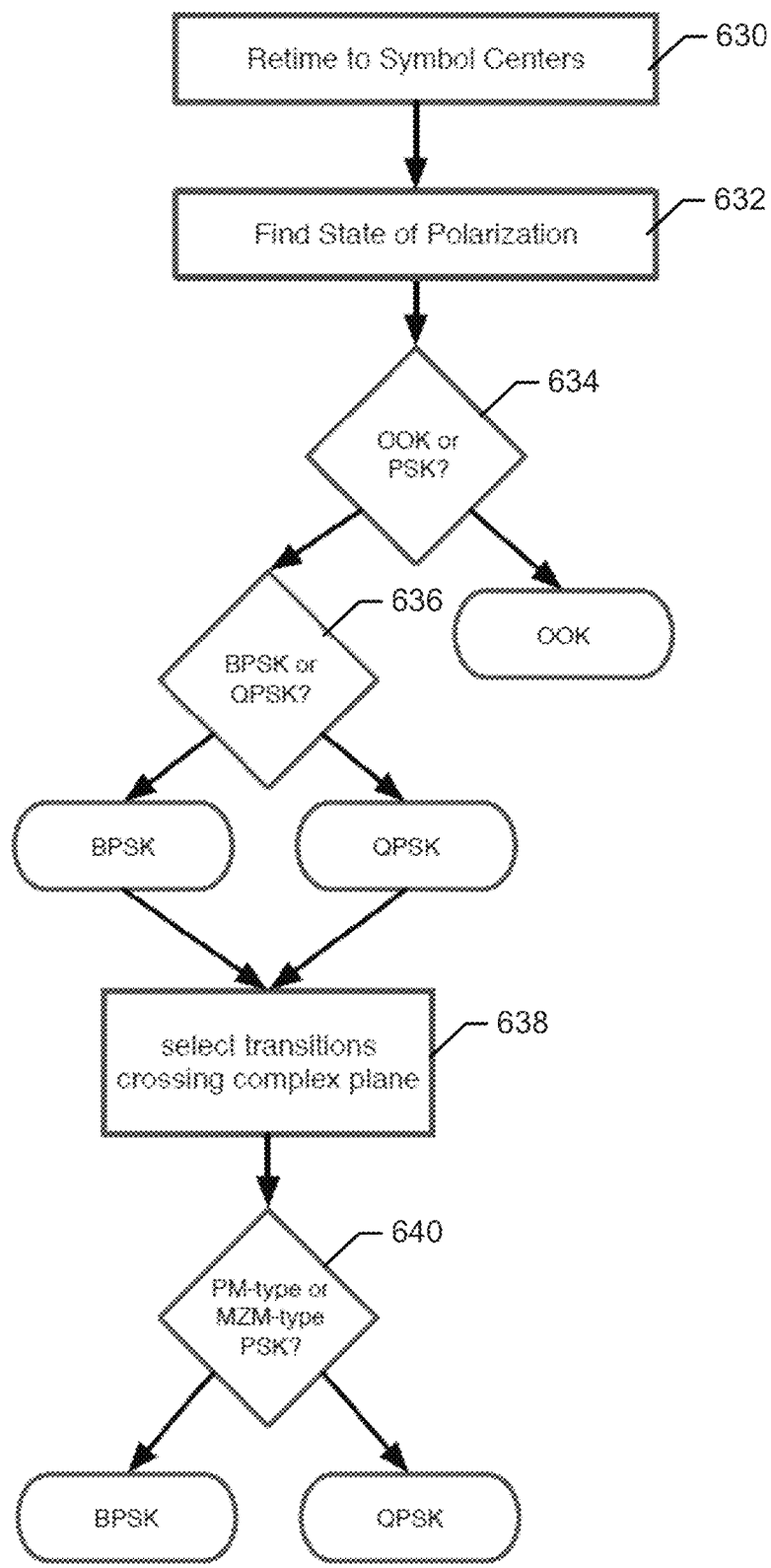
Figure 6C:
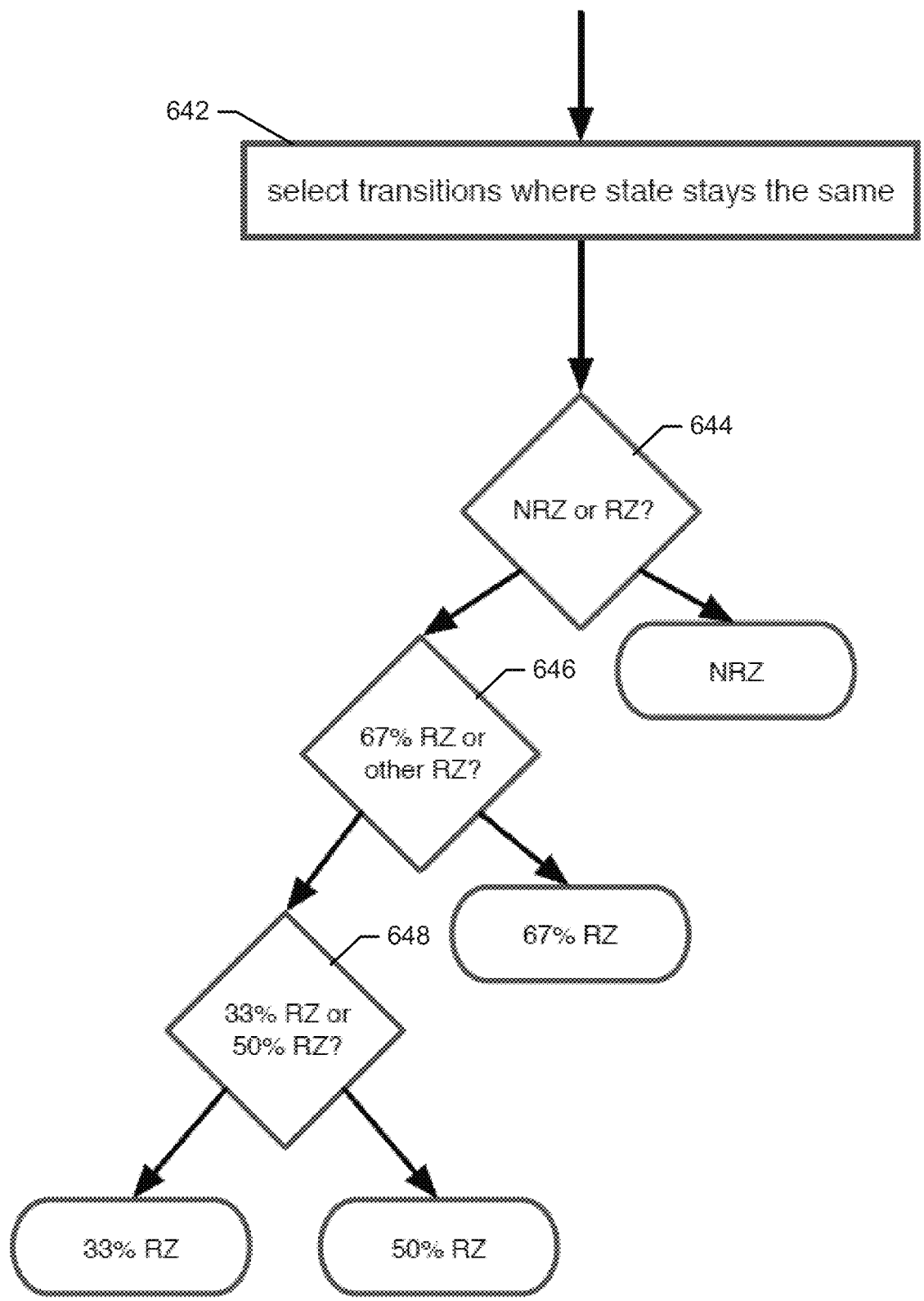
Figure 7:
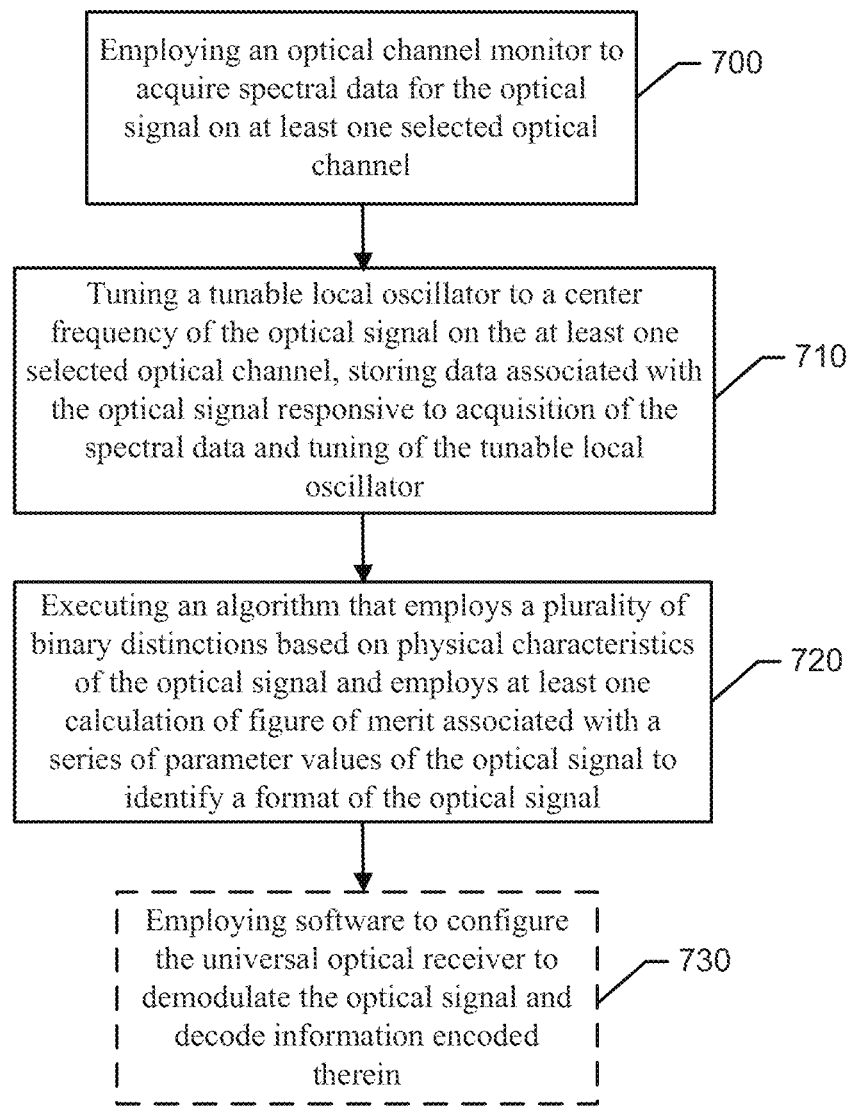

FIG. 6, which includes FIGS. 6A, 6B and 6C, illustrates a block diagram showing more detail associated with the operation of one example algorithmic process that may be associated with the operation of the format identifier according to an example embodiment; and FIG. 7 shows an exemplary block diagram of a method according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As indicated above, some example embodiments may enable the provision of a universal optical receiver that may be capable of identifying signal characteristics such as, for example, data rate, modulation format and/or transmission impairments associated with optical signals on one or more channels. The universal optical receiver may be enabled to identify the type of signal employed on any selected channel without knowing any details about the transmitter or otherwise having any a priori knowledge thereof. After identifying the type of signal based only on the physical characteristics of the optical signal, some example embodiments may further enable the universal optical receiver to dynamically reconfigure itself to process the received signal.

Figure 1:
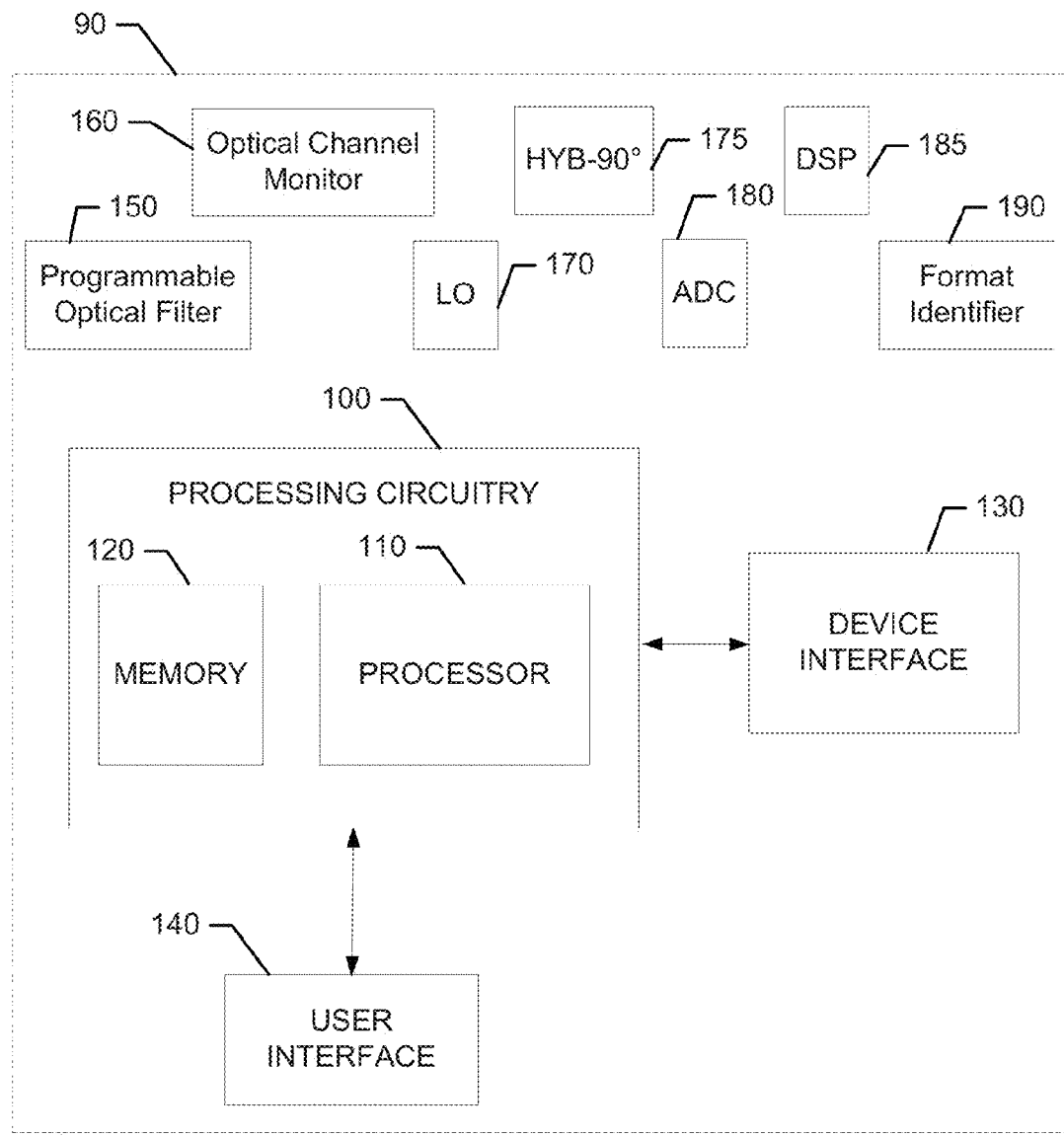
FIG. 1 illustrates a block diagram showing one example of a universal optical receiver of one example embodiment.

FIG. 1 illustrates a block diagram showing one example of a universal optical receiver of one example embodiment. In this example, the universal optical receiver is embodied as a computer controlled device, and in some embodiments the universal optical receiver may be dynamically programmable to adjust its signal processing to enable processing of an identified optical signal in response to having identified the optical signal.

As shown in FIG. 1, the universal optical receiver 90 may include or otherwise be in communication with processing circuitry 100 that is configurable to perform actions in accordance with example embodiments described herein. As such, for example, at least some of the functions attributable to the universal optical receiver 90 may be carried out by or otherwise instructed by the processing circuitry 100.

The processing circuitry 100 may be configured to perform data processing, control function execution and/or other processing and management services according to an example embodiment of the present invention. In some embodiments, the processing circuitry 100 may be embodied as a chip or chip set. In other words, the processing circuitry 100 may comprise one or more physical packages (e.g., chips) including materials, components and/or wires on a structural assembly (e.g., a baseboard).

In an example embodiment, the processing circuitry 100 may include one or more instances of a processor 110 and memory 120 that may be in communication with or otherwise control a device interface 130 and, in some cases, a user interface 140. As such, the processing circuitry 100 may be embodied as a circuit chip (e.g., an integrated circuit chip) configured (e.g., with hardware, software or a combination of hardware and software) to perform operations described herein.

The user interface 140 (if implemented) may be in communication with the processing circuitry 100 to receive an indication of a user input at the user interface 140 and/or to provide an audible, visual, mechanical or other output to the user. As such, the user interface 140 may include, for example, a display, one or more buttons or keys (e.g., function buttons), and/or other input/output mechanisms (e.g., keyboard, microphone, speakers, cursor, joystick, lights and/or the like). The user interface 140 may display information indicating an identity or certain characteristics of an optical signal being processed by the universal optical receiver 90. Moreover, in some cases, the user interface 140 may include options for selection of a channel among a plurality of optical channels. The selected channel may then be processed and information associated therewith may be presented on a display of the user interface 140. Information associated with further processing of the optical signal and, in some cases, decoded information associated with the optical signal may thereafter be presented via the user interface 140.

The device interface 130 may include one or more interface mechanisms for enabling communication with other external devices or internal functional components of the universal optical receiver 90 (e.g., programmable optical filter 150, optical channel monitor 160, local oscillator (LO) 170, optical hybrid (HYB-90°) 175, A/D converters 180, digital signal processor 185, and a format identifier 190). In some cases, the device interface 130 may be any means such as a device or circuitry embodied in either hardware, or a combination of hardware and software that is configured to receive and/or transmit data from/to devices in communication with the processing circuitry 100.

In an exemplary embodiment, the memory 120 may include one or more non-transitory memory devices such as, for example, volatile and/or non-volatile memory that may be either fixed or removable. The memory 120 may be configured to store information, data, applications, instructions or the like for enabling the universal optical receiver 90 to carry out various functions in accordance with exemplary embodiments of the present invention. For example, the memory 120 could be configured to buffer input data for processing by the processor 110. Additionally or alternatively, the memory 120 could be configured to store instructions for execution by the processor 110. As yet another alternative, the memory 120 may include one or more databases that may store a variety of data sets indicative of patterns and/or encoding schemes to be employed. Among the contents of the memory 120, applications may be stored for execution by the processor 110 in order to carry out the functionality associated with each respective application. In some cases, the applications may include directions for control of the universal optical receiver 90 to achieve identification of optical signals on a selected channel and dynamic configuration of the receiver for decoding of an identified signal or signals.

The processor 110 may be embodied in a number of different ways. For example, the processor 110 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 110 may be configured to execute instructions stored in the memory 120 or otherwise accessible to the processor 110. As such, whether configured by hardware or by a combination of hardware and software, the processor 110 may represent an entity (e.g., physically embodied in circuitry—in the form of processing circuitry 100) capable of performing operations according to embodiments of the present invention while configured accordingly. Thus, for example, when the processor 110 is embodied as an ASIC, FPGA or the like, the processor 110 may be specifically configured hardware for conducting the operations described herein. Alternatively, as another example, when the processor 110 is embodied as an executor of software instructions, the instructions may specifically configure the processor 110 to perform the operations described herein.

In an example embodiment, the processor 110 (or the processing circuitry 100) may be embodied as, include or otherwise control the universal optical receiver 90. As such, in some embodiments, the processor 110 (or the processing circuitry 100) may be said to cause each of the operations described in connection with the universal optical receiver 90 by directing the universal optical receiver 90 to undertake the corresponding functionalities responsive to execution of instructions or algorithms configuring, the processor 110 (or processing circuitry 100) accordingly.

An optical input may be provided on one of what may potentially be a plurality of optical channels that may be monitored (e.g., via the optical channel monitor 160). Thus, in some examples, input may be provided via a fiber optic cable or an optical signal possibly containing multiple optical channels. The optical input may pass through the programmable optical filter 150, which may have initial programming to pass all wavelengths. The optical channel monitor 160 may collect spectral data to detect the presence of channels. In some cases, a high resolution optical spectrum analyzer and corresponding software for channel detection could perform the channel detection function. If multiple channels are employed, after a channel is selected for analysis, the signal on the selected channel is filtered (e.g., via programmable optical filter 150). As such, the programmable optical filter 150 may initially be programmed to pass all wavelengths, but may thereafter be reprogrammed to pass only the wavelength of the channel that is selected. Accordingly, spectral data may be acquired by the optical channel monitor 160, which may also perform channel detection. The programmable optical filter 150 may be used to isolate individual channels for identification. In some cases, the filtering may include the employment of a variable-bandpass optical filter (e.g., having a pass band of about 10 GHz to 1 THz). The signal may then be amplified to a preset total power and fed into a coherent optical detection subsystem having a tunable local oscillator (e.g., LO 170), which may be set to the frequency of the selected channel. The resulting in-phase, I, and quadrature, Q, photocurrents for each polarization may then be digitized using digitizers. The digitized time series may then be I/Q demodulated to recover the symbol clock rate and determine the dispersion compensation to apply digitally for symbol recovery. For example, recovery may be performed in accordance with the disclosure provided at M. G. Taylor, "Coherent Detection Method Using DSP for Demodulation of Signal and Subsequent Equalization of Propagation Impairments," IEEE Photonics Technology Letters 16, 674-676 (2004), the contents of which are incorporated herein by reference. Data symbols may then be recovered and the time series may be analyzed using amplitude and phase histograms, the constellation pattern, and the mean symbol pulse profile. The identified format, clock rate and dispersion compensation (e.g., as identified by the format identifier 190) may then be returned to the user (e.g., via the user interface 140). In a cognitive optical network, these characteristics identified by the format identifier 190 may then be used to configure the universal optical receiver 90 to optimize spectral and data efficiency, and to demodulate a continuously received data stream.

Figure 2:
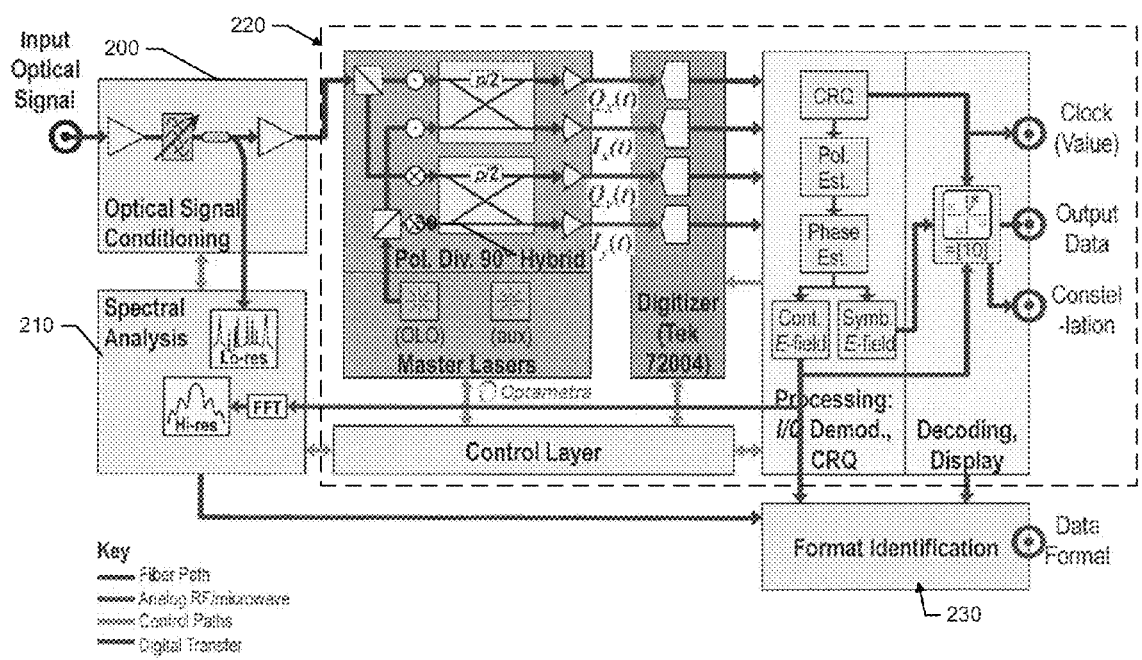
FIG. 2 illustrates a system block diagram of one implementation of a portion of the universal optical receiver that may be used for data format identification for an optical signal being processed according to an example embodiment.

FIG. 2 illustrates a system block diagram of a specific example embodiment of one implementation of a portion of the universal optical receiver 90 that may be used for data format identification for an optical signal being processed. Some of the blocks shown in FIG. 2 are example implementations of the blocks described above in connection with FIG. 1. As can be seen from FIG. 2, the universal optical receiver 90 may include optical signal conditioning 200 and spectral analysis 210. Digitization may be accomplished via a signal processing arrangement 220 and then a format identification arrangement 230 may be employed to arrive at an identified data format. Formats such as on-off keying (OOK), binary phase-shift keying (BPSK), quadrature phase-shift keying (QPSK) may be determined and, in situations where auxiliary-amplitude modulation is employed, primary versus alternative implementations may be distinguished. For example, distinctions may be made between standard non-return-to-zero (NRZ) or optical duobinary (ODB), between BPSK implemented using a Mach-Zander (MZ) modulator or a phase modulator (PM), or between QPSK implemented using a dual-parallel MZ (DPMZ) or sequential MZ and PM (MZPM). Auxiliary amplitude modulation may be determined among principal implementations based on MZ modulators: 33%, 50% or 67% duty cycle return-to-zero (RZ33, RZ50, RZ67) in some examples.

Example embodiments of the universal optical receiver 90 may therefore initiate signal identification by simultaneously determining the clock rate and the dispersion compensation for the signal on a selected channel. The baud rate may be determined by lowpass filtering, applying a quartic nonlinearity (e.g., the square of the optical power), and identifying the peak of the RF spectrum. A plurality (e.g., six) of filter frequencies may be used to avoid selecting harmonics of the clock rate, and the clock rate may be selected as the strongest tone over all frequencies analyzed in the frequency domain. For each clock band, chromatic dispersion compensation (CD) may be applied over a determined range, which may in some cases correspond to a user-defined range. The power in the clock tone may then be used as a figure of merit (FOM) to determine optimal compensation. OOK formats may exhibit local maxima near, but offset from, the optimal dispersion value, so a smoothing function may be applied to the clock power vs. dispersion compensation curve to eliminate the maxima. After dispersion compensation is applied, the modulation format may be determined on the basis of whether OOK or PSK is used based on the histogram of optical power at symbol centers. BPSK may then be distinguished from QPSK by examining whether the symbol center constellation points have 2-fold or 4-fold symmetry. The pulse profiles may be determined by comparing the symbol averaged pulse to four reference pulse shapes, digitally filtered by the low-pass bandwidth of the digitizer.

Figure 3:
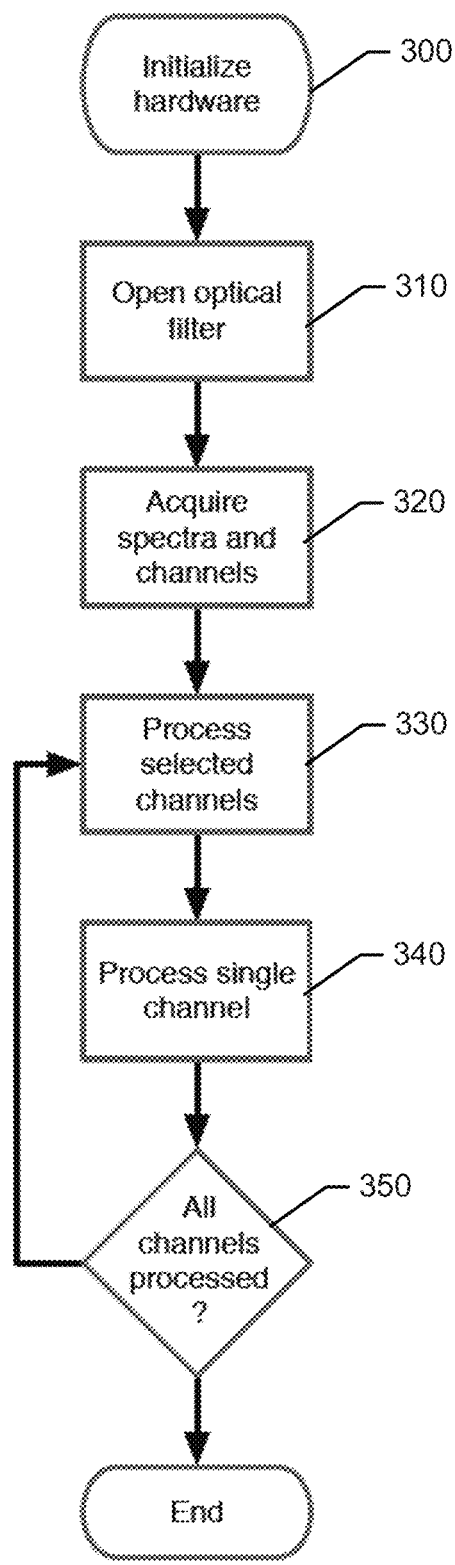
FIG. 3 illustrates a block diagram of a method for identifying an unknown optical signal according to an example embodiment.

FIG. 3 illustrates a block diagram of a method for identifying an unknown optical signal (e.g., by identifying the symbol rate and modulation format thereof) according to an example embodiment. As shown in FIG. 3, the method may include performing hardware initialization at operation 300. Hardware initialization may include establishing a connection from one or more optical channels to a programmable optical filter, an optical channel monitor, a coherent receiver, lasers, data acquisition software and hardware. If needed, the hardware may also be calibrated. Thereafter, the method may further include opening the optical filter at operation 310. Opening the optical filter may expose one or more optical channels to passage to the optical channel monitor. Optical spectra and channels may be acquired at operation 320. In an example embodiment, the optical channel monitor may acquire optical spectra and detect optical channels. However, in some alternative embodiments, a high resolution spectrometer may be employed in connection with another channel detection process that may be implemented using software programmed accordingly. Selected channels may then be processed at operation 330. In an example embodiment, optical channels detected at operation 320 may be listed (e.g., in a table) by wavelength and frequency. The user may then select one, some or all of the optical channels to be detected. Alternatively or additionally, automatic selection or a predetermined selection of a channel may be provided. After one or more channels are selected, channel processing may be accomplished with respect to each channel as described in greater detail below in reference to FIG. 4 in order to identify the modulation format for each respective channel. At operation 340, processing of selected channels may be accomplished on a channel by channel basis. Again, the details for this processing of each channel are listed in FIG. 4. An inquiry may then be made at operation 350 to determine whether all selected channels have been processed. If not, a next remaining channel will be processed by going back through operations 330 and 340 as appropriate. If all channels have been processed, the method may end and the corresponding previously unknown optical signals may be identified. The universal optical receiver 90 may thereafter be configured to demodulate and/or decode each respective identified signal.

Figure 4:
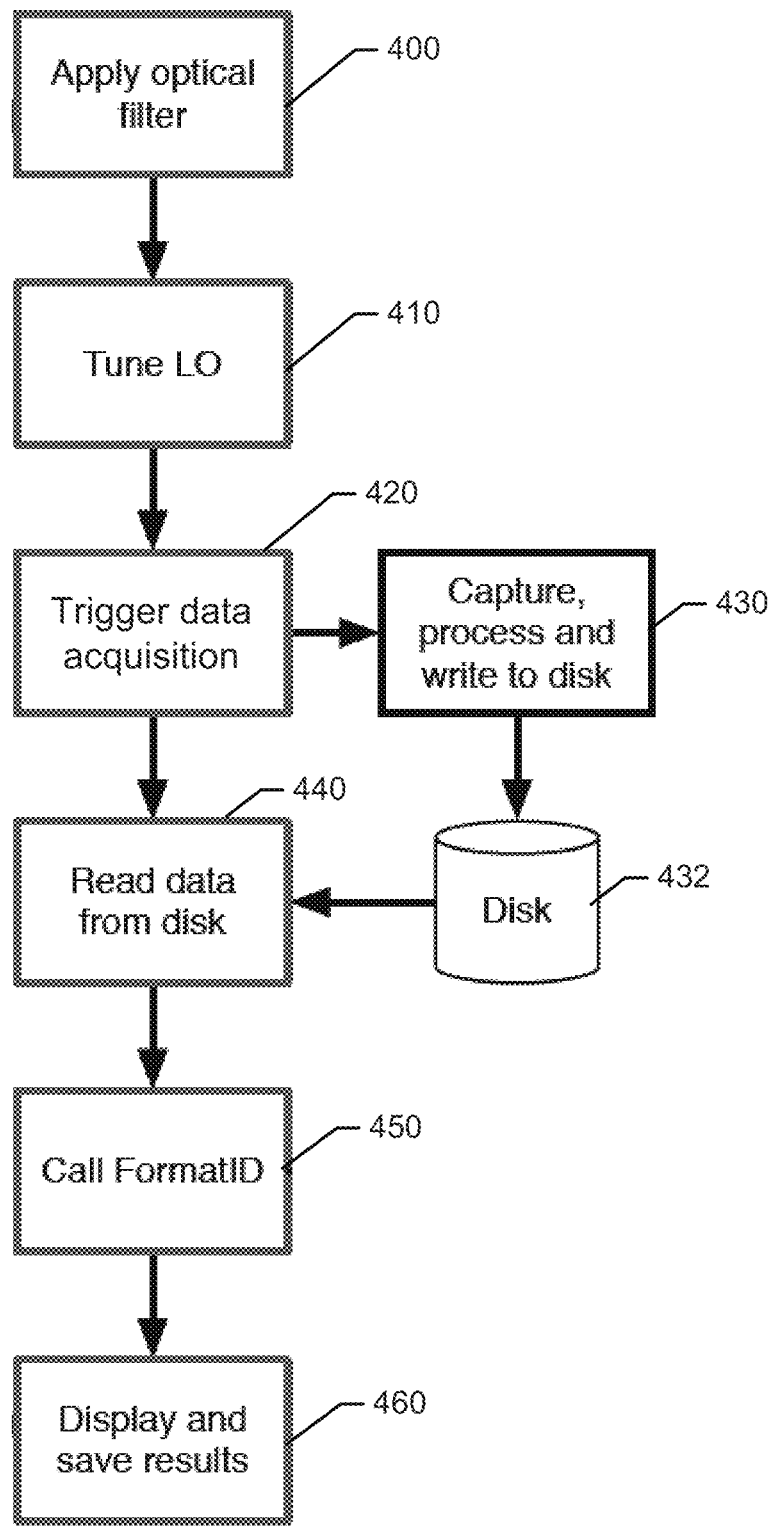
FIG. 4 illustrates a block diagram of a method of processing a single channel according to an example embodiment.

Processing of a single channel (as mentioned in operation 340) responsive to channel selection in operation 330 is shown in more detail in the flow chart shown in FIG. 4. In this regard, FIG. 4 illustrates a block diagram of a method of processing a single channel according to an example embodiment.

As shown in FIG. 4, the method may include applying an optical filter at operation 400. An individual optical channel may be isolated by setting a passband filter centered on the frequency of the optical channel. A typical pass bandwidth may be, for example, 40 GHz. The user can specify the bandwidth to be used via the user interface 140 in some embodiments. A LO may then be tuned at operation 410. The coherent receiver may have an internal laser that may act as a local oscillator (LO). The LO may be tuned to the center frequency of the current channel.

At operation 420, data acquisition may be triggered so that, for example, configured software may be used to acquire a time series of data from digitizers. In some embodiments, after the triggering of the format identifier operation 430 may be initiated to capture, process and write the data to disk 432 or other storage media. This data may be read at operation 440 and into local memory. However, in some embodiments, responsive to triggering of the data acquisition at operation 420, data may immediately be read into local memory at operation 440 without necessarily being stored to disk 432 first at operation 430.

Thereafter, at operation 450, a format identifier (e.g., format identifier 190) may be called or otherwise triggered. The format identifier may be configured software for performing an algorithm to identify the format of the optical signal on the selected channel being processed. In an example embodiment, the format identifier may be configured to utilize three variables including first variable identifying four channels of time series data, a second variable comprising an array of channel delays (e.g., accounting for time differences in cable lengths between the receiver and digitizers or various other delays in the front end of a digitizer), and a third variable comprising a matrix representing errors in the optical hybrid within the coherent receiver. At operation 460, the format identifier may return information identifying the chromatic dispersion compensation, the data rate and the optical modulation format of the optical signal on the selected channel. The results may be displayed (e.g., via the user interface 140) in any desirable format. However, in one embodiment, a table of the data may be provided along with indications regarding the channel wavelengths and/or frequencies of the corresponding channel or channels that are selected. In some embodiments, screen captures of the analyzed data itself or other representations of the results of the format identifier's analysis may be saved (e.g., to disk 432). The results may then be used to optimize the universal optical receiver to process and decode the corresponding information encoded in the optical signal on any of the selected channels.

Figure 5:
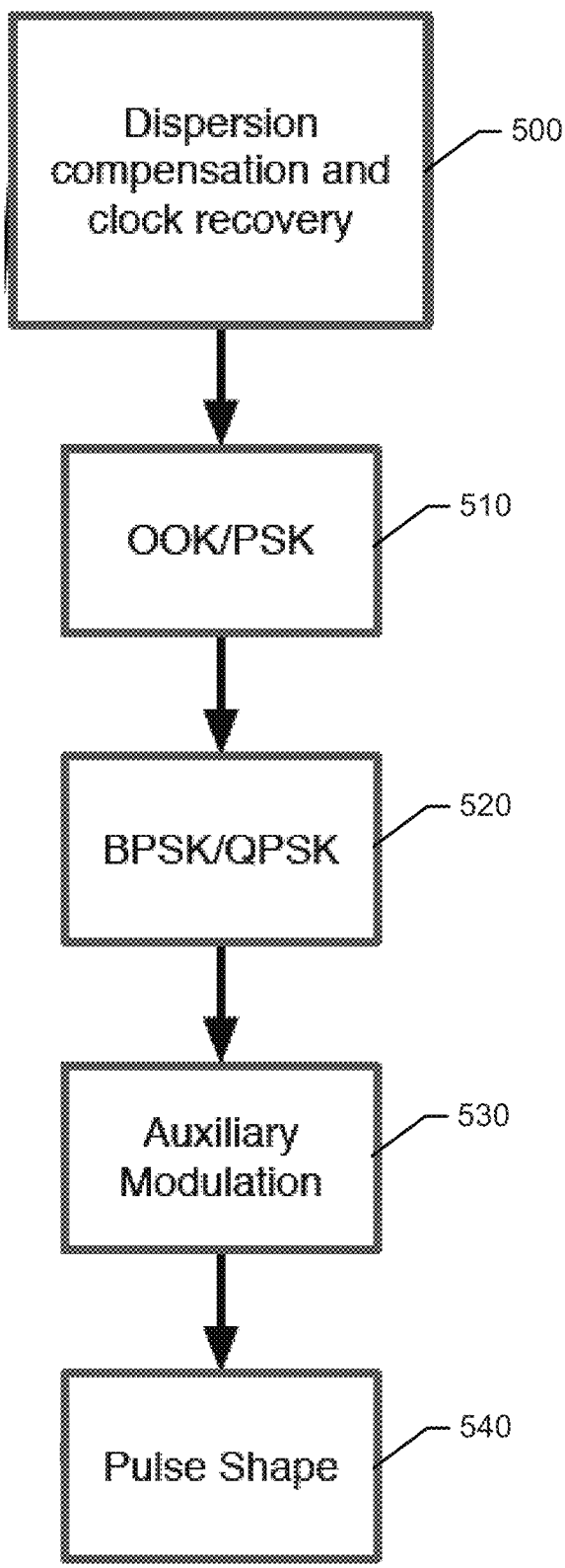
FIG. 5 illustrates a block diagram of one such example algorithmic process according to an exemplary embodiment.

Operation of the format identifier may proceed in accordance with a number of different algorithmic processes. FIG. 5 illustrates a block diagram of one such example algorithmic process. As shown in FIG. 5, format identification may include dispersion compensation and clock recovery at operation 500. Generally speaking, input signals may be distorted by CD. To determine the amount of chromatic dispersion, the format identifier may be configured to apply varying amounts of inverse CD and select the one that gives the best result. The FOM for CD determination may be the same FOM used for symbol clock. Accordingly, a loop may be executed to try each CD value and within the loop, symbol clock estimation may also be executed (see FIG. 6 below). A determination may then be made as to whether OOK or PSK is employed using analysis of power histograms at operation 510. After clock frequency is known, a sequence of values of the electric filed of the signal at symbol centers may be calculated. This electric field may be subject to phase rotation due to the carrier frequency and polarization rotation from the state of polarization of the signal with respect to axes of the analyzer. A key difference between OOK and PSK formats is that the signal has near zero optical power for about half of the symbols for OOK and the optical power is the same non-zero value for all symbols for PSK. Thus, a decision as to whether a signal is OOK or PSK can be made by examining the optical power using the equation below.

$$OOK\_PSKDec = \frac{std.dev.of |\text{electric field at symbol centers}|}{\text{mean of}|\text{electric field at symbol centers}|}$$

$$OOK\_PSKDec > 0.5 \Rightarrow OOK$$

$$OOK\_PSKDec \leq 0.5 \Rightarrow BPSK \text{ or } QPSK$$

At operation 520, a subsequent distinction between BPSK and QPSK may be made if PSK is determined at operation 510. In this regard, in some examples, the state of polarization (SOP) of the signal may be obtained by averaging the Stokes vector of the symbol center electric field values and then applying a rotation (e.g., a Jones matrix) to select the electric field component in that SOP while the phase of the signal is unknown. A BPSK signal may correspond to two clusters of constellation points opposite one another on the complex plane, that rotate at the carrier offset frequency. When the complex values corresponding to these points are squared, the result is one cluster of points that rotates at twice the carrier offset frequency. The Fourier transform of the square therefore has a peak at 2×(carrier offset frequency). If the signal is QPSK it may correspond to four clusters of constellation points arranged in a square that rotates at the carrier offset frequency. When the QPSK constellation is squared, the result is two clusters of points that average to zero, not a single cluster as with BPSK. Thus, the Fourier transform of the square does not have a prominent peak in QPSK. When either a BPSK or QPSK signal is raised to the fourth power, a single cluster rotating at 4×(carrier offset frequency) results and the Fourier transform has a prominent peak at that frequency. The height of the peak in the $4^{th}$ power serves as a reference level. Thus, the decision of BPSK or QPSK may be based on the height of the peak of the Fourier transform of the square of the complex signal as shown in the equation below.

$$\text{BPSK\_QPSKDec} = \frac{\text{height of peak of Fourier transform of (electric field)}^2}{\text{height of peak of Fourier transform of (electric field)}^4}$$

$$\text{BPSK\_QPSKDec} > 0.25 \Rightarrow BPSK$$

$$\text{BPSK\_QPSKDec} \leq 0.25 \Rightarrow QPSK$$

Thereafter, determinations may be made as to particular auxiliary modulations schemes that may be employed at operation 530. Auxiliary modulation scheme differentiation may be made with respect to NRZ vs. RZ and, if RZ, with respect to specific types thereof. For example, differentiation may also be made between carrier suppressed RZ (CSRZ) and other types of RZ (e.g., 33% RZ, 50% RZ or 67% RZ). In some embodiments, determining auxiliary modulation schemes may involve the comparison of data to ideal pulse profiles. Thereafter, pulse shape may be determined at operation 540.

FIG. 6, which includes FIGS. 6A, 6B and 6C, illustrates a block diagram showing more detail associated with the operation of one example algorithmic process that may be associated with the operation of the format identifier. In this regard, FIG. 6 illustrates an example of the operations that may occur within operation 450 of FIG. 4 according to one example embodiment, and a more detailed view of operations associated with the processes discussed in relation to FIG. 5. At operation 600, channel delays may be accounted for by adjusting each of the four time series in time by its corresponding channel delay. After the time adjustment, the four time series may be interpolated to a common time series with samples separated by the sample rate of the ADCs. Optical hybrid errors may then be accounted for at operation 602. As such, the time series may be compensated for phase, amplitude and polarization errors in the optical hybrid that is within the coherent optical receiver. Thereafter, at operation 604, dispersion compensation and clock recovery may be accomplished. In order to determine the clock rate and required CD, an iterative search may be performed over a list of CD values and a list of clock bands. The power in the clock tone may be used as a figure of merit (FOM) for the CD compensation. When the correct compensation has been applied, the FOM may be maximized. In some embodiments, operation 604 may be broken down into a series of steps as shown in FIG. 6. In this regard, operation 604 may include incrementing a CD value at operation 610 and applying CD compensation at operation 612. The dock band may then be incremented at operation 614 followed by low pass filtering of data at operation 616 and application of nonlinearity and a Fast Fourier Transform (FFT) at operation 618. At operation 620, the equation FOM(CD, Clock)=Max(FFT) may be employed, after which time a decision may be made as to whether all clock bands have been searched at operation 622. If all bands have not been searched, the operation may return to incrementing of the clock band (operation 614) for the next band. However, if all bands have been searched, then a determination may be made as to whether all CD values have been searched at operation 624. If all CD values have not been searched, operation may return to incrementing the CD value at operation 610. If all CD values have been searched, then [CD, Clock]=Max(FOM) and dispersion compensation and clock recovery is complete at operation 626.

After operation 604, retiming to symbol centers may be performed at operation 630 and the state of polarization may be found at operation 632. A determination may then be made at operation 634 as to whether OOK or PSK has been employed in relation to the optical signal. If PSK is determined, a determination may then be undertaken at operation 636 to distinguish between BPSK and QPSK. Thereafter, at operation 638, transitions crossing a complex plane may be selected. A determination may then be made as to whether PM-type or MZM-type PSK is employed at operation 640. Transitions may then be selected where the state stays the same at operation 642. A determination may then be made as to whether NRZ or RZ is employed at operation 644. If RZ is employed, an initial determination to distinguish between 67% RZ or other RZ may initially be made at operation 646. A subsequent determination may then be made to distinguish between 33% RZ and 50% RZ at operation 648. FIG. 7 illustrates an example structure for determining symbol clock frequency, optical modulation format, auxiliary amplitude modulation format, and required chromatic dispersion compensation according to an example embodiment (corresponding to operations 616 to 620 of FIG. 6).

Accordingly, as can be appreciated from the example of FIG. 6, decisions associated with the algorithm for determining parameters of the optical signal may be broken down into a series of binary decisions made on the basis of clear decision-making thresholds. However, determining chromatic dispersion and symbol clock involve calculations associated with employing a series of different parameter values and choosing the best based on FOM since FOM can be quickly computed. As a result, example embodiments may enable relatively fast and accurate determinations regarding the format of an optical signal based only on the physical characteristics of the signal and without any a priori knowledge of the transmitter used to generate the corresponding signal.

FIG. 7 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions, in this regard, the computer program instructions which embody the procedures described above may be stored by a memory device of a user terminal and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block (s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method of processing an optical signal in a universal optical receiver according to one embodiment of the invention, as shown in FIG. 7, may include employing an optical channel monitor to acquire spectral data for the optical signal on at least one selected optical channel at operation 700 and tuning a tunable local oscillator to a center frequency of the optical signal on the at least one selected optical channel, storing data associated with the optical signal responsive to acquisition of the spectral data and tuning of the tunable local oscillator at operation 710. The method may further include executing (e.g., via processing circuitry) an algorithm that employs a plurality of binary distinctions based on physical characteristics of the optical signal and employs at least one calculation of figure of merit associated with a series of parameter values of the optical signal to identify a format of the optical signal at operation 720.

In some embodiments, additional optional operations (an example of which is shown in dashed lines in FIG. 7) may be included or the operations described above may be modified or augmented. Each of the additional operations, modification or augmentations may be practiced in combination with the operations above and/or in combination with each other. Thus, some, all or none of the additional operations, modification or augmentations may be utilized in some embodiments. In an example embodiment, the method may further include employing software to configure the universal optical receiver to demodulate the optical signal and decode information encoded therein at operation 730. In an example embodiment, the method may further include enabling an operator to select one or more channels for processing corresponding optical signals thereon or automatically providing for such selection (e.g., without any operator). In such an example, the method may further include sequentially determining a format of each of the corresponding optical signals responsive to selection of more than one channel. In some embodiments, the method may include displaying at least a clock rate determined for the optical signal and an optical modulation format determined for the optical signal on a display. In an example embodiment, the method may include storing the data associated with the optical signal remotely for later retrieval and processing by the processing circuitry or locally for real-time processing by the processing circuitry. In some embodiments, the plurality of binary distinctions may include at least two of determining whether on-off keying or phase shift keying is employed, determining whether binary phase shift keying or quadrature phase shift keying is employed, and determining whether non-return-to-zero or return-to-zero pulses are employed. In an example embodiment, the at least one calculation of figure of merit associated with a series of parameter values may be performed based on a figure of merit based calculation to determine clock rate of the optical signal or to determine dispersion compensation of the optical signal.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A universal optical receiver comprising:
    an optical channel monitor configured to acquire spectral data for an optical signal on at least one selected optical channel;
    a tunable local oscillator configured to be tuned to a center frequency of the optical signal on the at least one selected optical channel;
    a storage device configured to store data associated with the optical signal responsive to acquisition of the spectral data and tuning of the tunable local oscillator; and
    processing circuitry configured to execute an algorithm that employs a plurality of binary distinctions based on physical characteristics of the optical signal and employs at least one calculation of figure of merit associated with a series of parameter values of the optical signal to identify, within the universal optical receiver, a format of the optical signal,
    wherein each of the binary distinctions is defined based on comparing a result of a respective different calculation made based on the physical characteristics to a threshold forming the basis for the corresponding binary distinctions.

2. The universal optical receiver of claim 1, wherein the processing circuitry is further configured to employ software to configure the universal optical receiver to demodulate the optical signal and decode information encoded therein.

3. The universal optical receiver of claim 1, further comprising a user interface via which an operator is enabled to select one or more channels for processing corresponding optical signals thereon.

4. The universal optical receiver of claim 3, wherein a format of each of the corresponding optical signals is sequentially determined responsive to selection of more than one channel.

5. The universal optical receiver of claim 3, wherein the user interface includes a display on which at least a clock rate determined for the optical signal and an optical modulation format determined for the optical signal.

6. The universal optical receiver of claim 1, wherein the storage device stores the data associated with the optical signal remotely for later retrieval and processing by the processing circuitry.

7. The universal optical receiver of claim 1, wherein the storage device stores the data associated with the optical signal locally for real-time processing by the processing circuitry.

8. The universal optical receiver of claim 1, wherein the plurality of binary distinctions include at least two of:
   determining whether on-off keying or phase shift keying is employed;
   determining whether binary phase shift keying or quadrature phase shift keying is employed; and
   determining whether non-return-to-zero or return-to-zero pulses are employed.

9. The universal optical receiver of claim 1, wherein the at least one calculation of figure of merit associated with a series of parameter values is performed based on a figure of merit based calculation to determine clock rate of the optical signal or to determine dispersion compensation of the optical signal.

10. A method of processing an optical signal in a universal optical receiver, the method comprising:
   employing an optical channel monitor to acquire spectral data for the optical signal on at least one selected optical channel;
   tuning a tunable local oscillator to a center frequency of the optical signal on the at least one selected optical channel;
   storing data associated with the optical signal responsive to acquisition of the spectral data and tuning of the tunable local oscillator; and
   executing, via processing circuitry of the universal optical receiver, an algorithm that employs a plurality of binary distinctions based on physical characteristics of the optical signal and employs at least one calculation of figure of merit associated with a series of parameter values of the optical signal to identify, within the universal optical receiver, a format of the optical signal,
   wherein each of the binary distinctions is defined based on comparing a result of a respective different calculation made based on the physical characteristics to a threshold forming the basis for the corresponding binary distinctions.

11. The method of claim 10, further comprising employing software to configure the universal optical receiver to demodulate the optical signal and decode information encoded therein.

12. The method of claim 10, further comprising enabling an operator to select one or more channels for processing corresponding optical signals thereon.

13. The method of claim 12, further comprising sequentially determining a format of each of the corresponding optical signals responsive to selection of more than one channel.

14. The method of claim 10, further comprising displaying at least a clock rate determined for the optical signal and an optical modulation format determined for the optical signal on a display.

15. The method of claim 10, further comprising storing the data associated with the optical signal remotely for later retrieval and processing by the processing circuitry.

16. The method of claim 10, further comprising storing the data associated with the optical signal locally for real-time processing by the processing circuitry.

17. The method of claim 10, wherein the plurality of binary distinctions include at least two of:
   determining whether on-off keying or phase shift keying is employed;
   determining whether binary phase shin keying or quadrature phase shin keying is employed; and
   determining whether non-return-to-zero or return-to-zero pulses are employed.

18. The method of claim 10, wherein the at least one calculation of figure of merit associated with a series of parameter values is performed based on a figure of merit based calculation to determine clock rate of the optical signal or to determine dispersion compensation of the optical signal.

19. A computer program product comprising a computer-readable storage medium having computer-executable program code instructions stored therein, the computer-executable program code instructions comprising program code instructions for:
   employing an optical channel monitor to acquire spectral data for the optical signal on at least one selected optical channel;
   tuning a tunable local oscillator to a center frequency of the optical signal on the at least one selected optical channel;
   storing data associated with the optical signal responsive to acquisition of the spectral data and tuning of the tunable local oscillator;
   executing, via processing circuitry of a universal optical receiver, an algorithm that employs a plurality of binary distinctions based on physical characteristics of the optical signal and employs at least one calculation of figure of merit associated with a series of parameter values of the optical signal to identity, within the universal optical receiver, a format of the optical signal; and
   employing executable instructions to configure the universal optical receiver based on the identified format of the optical signal such that the universal optical receiver demodulates the optical signal and decodes information encoded therein,
   wherein each of the binary distinctions is defined based on comparing a result of a respective different calculation made based on the physical characteristics to a threshold forming the basis for the corresponding binary distinctions.

* * * * *